United States Patent [19]

White et al.

[11] 4,243,794

[45] Jan. 6, 1981

[54] MIXTURE OF ROUGH AND SPHEROIDIZED RESIN PARTICLES

[75] Inventors: James L. White, Maplewood; James G. Berg, North St. Paul, both of Minn.

[73] Assignee: Minnesota Mining and Manufacturing Company, St. Paul, Minn.

[21] Appl. No.: 949,956

[22] Filed: Oct. 10, 1978

Related U.S. Application Data

[60] Division of Ser. No. 825,925, Aug. 19, 1977, Pat. No. 4,154,871, which is a continuation of Ser. No. 612,639, Sep. 12, 1975, abandoned.

[51] Int. Cl.$^2$ .................. C08J 3/12; C08G 59/00
[52] U.S. Cl. ..................... 528/112; 264/15; 525/50; 525/55; 525/191; 525/533; 525/934; 528/94; 528/502
[58] Field of Search ............... 428/402; 260/830 TW, 260/823, 857 TW; 264/15; 528/502, 112, 94; 525/533, 934, 50, 55, 191

[56] References Cited

U.S. PATENT DOCUMENTS

| | | | |
|---|---|---|---|
| 2,969,038 | 1/1961 | Neumann | 118/429 |
| 2,976,574 | 3/1961 | Keutgen et al. | 18/48 |
| 3,196,033 | 7/1965 | Brooks | 117/21 |
| 3,263,980 | 8/1966 | Feder et al. | 263/21 |
| 3,505,434 | 4/1970 | Battaerd | 264/15 |
| 3,877,918 | 4/1975 | Cerbo | 65/142 |
| 3,887,668 | 6/1975 | Monjo | 264/14 |
| 3,896,196 | 7/1975 | Dickey et al. | 264/6 |
| 3,933,954 | 1/1976 | Gebhard et al. | 264/8 |
| 4,040,993 | 8/1977 | Elbling et al. | 260/18 EP |

*Primary Examiner*—Earl A. Nielsen
*Attorney, Agent, or Firm*—Cruzan Alexander; Donald M. Sell; Robert E. Granrud

[57] ABSTRACT

Free flowing resin powder which upon striking a heated article fuses, flows and hardens to provide a protective coating, which powder consists of a mixture of rough and rounded particles, the rough particles having a granular appearance as a result of being pulverized and the rounded particles having smooth, glossy, spheroidized surfaces as a result of being briefly heated to a temperature above the softening point. Preferably each particle of the powder is a blend of thermosetting resin and curing agent.

6 Claims, 1 Drawing Figure

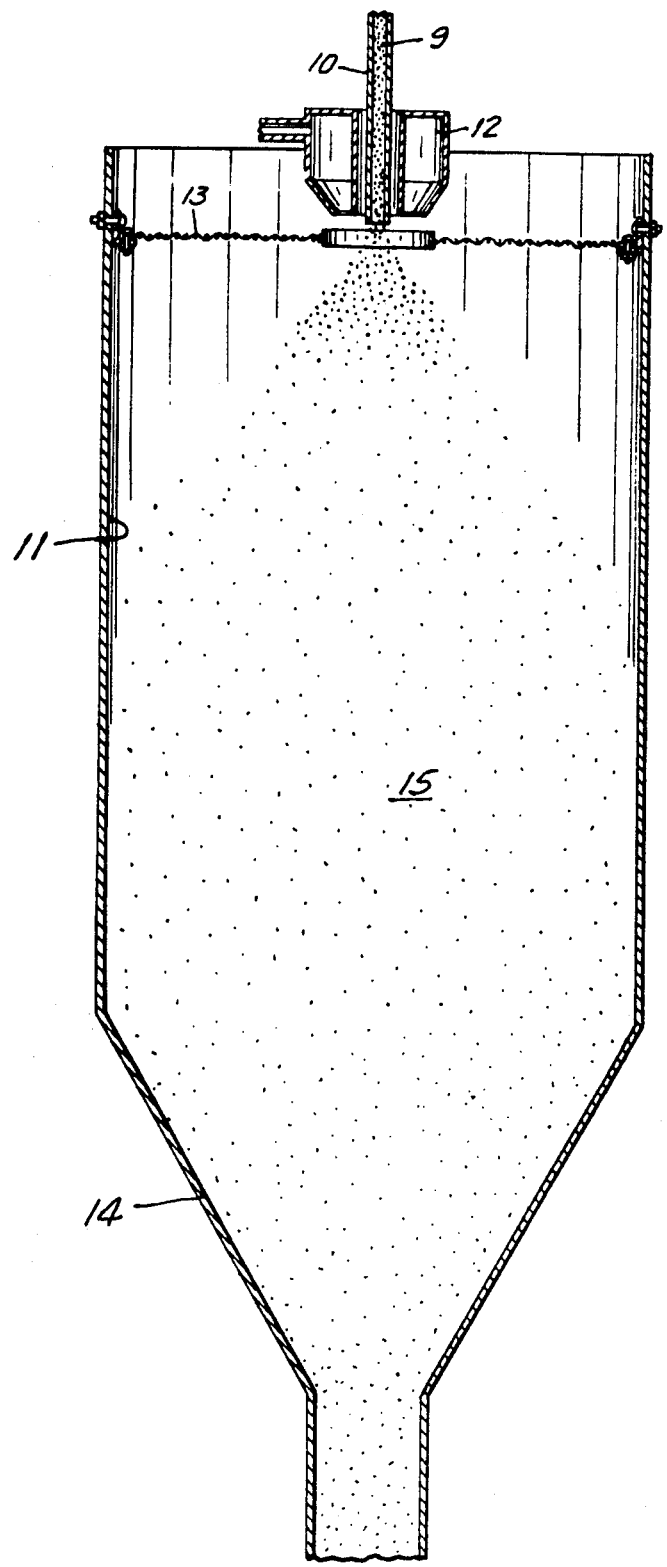

MIXTURE OF ROUGH AND SPHEROIDIZED RESIN PARTICLES

CROSS REFERENCE TO RELATED APPLICATION

This application is a division of applicants' copending application Ser. No. 825,925, filed Aug. 19, 1977 now U.S. Pat. No. 4,154,871 issued May 15, 1979, which in turn was a continuation of applicants' application Ser. No. 612,639, filed Sept. 12, 1975, now abandoned.

BACKGROUND OF THE INVENTION

Resin powder is widely used for applying protective coatings to a variety of articles such as corrosion-resistant coatings for metal pipe or electrically insulative coatings for electrical components. The coatings may be applied by blowing powder onto articles which have been preheated above the softening point of the powder which fuses and adheres to the articles upon contact. By electrostatically charging the powder, the articles may be maintained at room temperature and ground potential so that the powder is attracted to the article. This permits the powder to be selectively removed simply by blowing or brushing it off before applying heat to fuse the remaining powder in areas where a protective coating is desired. Regardless of the technique for applying the powder, the final coatings should be of uniform thickness in all areas to be protected.

More than one year prior to the filing of the aforementioned application Ser. No. 612,639, the company to which this application is assigned began marketing for protective coatings a resin powder, the particles of which were heat-rounded or spheroidized. The spheroidizing has been carried out by allowing finely pulverized resin particles to drop through a chamber in which the particles are first heated so that at least the surface portions flow to produce rounded, almost spherical particles which are quickly cooled. Other equipment for spheroidizing pulverized resin particles is shown in U.S. Pat. Nos. 3,263,980 (Feder), 2,976,574 (Keutgen) and 3,877,918 (Cerbo).

The spheroidized resin powder which has been on the market has demonstrated significantly improved penetration into small interstices as compared to the pulverized resin powder prior to spheroidization. The improvement has been pronounced when using electrostatic coating techniques. However, when using the prior spheroidized resin powder in an electrostatically charged fluidized bed to coat a series of articles, the coatings applied to the last articles have been much thinner than those applied to the first without replenishing the bed. Then after repeatedly replenishing the powder, it has been necessary to clean out the bed, discarding the remaining powder in order to avoid undesirably rough coatings.

Although some of the particles of the prior spheroidized resin powder did not fuse in the spheroidizing process, it was believed that the highest possible degree of heat-rounding was desirable. A relatively high percentage of the particles present when it became necessary to clean out the bed were not rounded, although there is no indication that anyone had examined them for shape. In any event, applicants have found that when resin powder containing very high percentages of rounded particles is used in an electrostatically charged fluidized bed, the coatings tend to have undesirable crater-like depressions.

FURTHER PRIOR ART

U.S. Pat. No. 3,196,033 (Brooks) teaches that the particles and powder used in its fluidized bed for applying coatings are rounded (col. 12, line 55) and preferably globular (col, 4, line 51). U.S. Pat. No. 3,196,032 (Seymour) uses a specially equipped fluidized bed to make a powder which is useful as a dry electrostatic printing ink. Individual particles of the powder are spherical as shown in FIG. 3. U.S. Pat. No. 2,969,038 (Neumann) concerns fluidized bed apparatus having a special gas diffusion plate 34 (FIG. 2) and teaches: "The particles must be of a somewhat spherical shape, as contrasted with a fiber-like shape . . . " (col. 1, lines 36–38).

THE PRESENT INVENTION

The present invention retains the aforementioned advantages of spheroidized resin powder while largely overcoming its shortcomings. This is accomplished by controlling the heat-rounding or spheroidizing so that a controlled proportion of the particles becomes rounded while a substantial percentage remains essentially in their original rough, pulverized state, and by screening the particles, preferably prior to the controlled spheroidization, so that they will pass through openings not exceeding 200 micrometers (whereas some particles of the previously marketed spheroidized resin powder were as large as 250 micrometers and about 8% by weight of the particles were in the range of 200–250 micrometers). Screening so that none of the partially spheroidized particles exceeds 160 micrometers tends to provide further improvement, and there are indications that smaller maximum sizes such as 140 micrometers would provide even better results, but at greater expense. As was the case with the prior spheroidized particles, the partially spheroidized particles (a) as stored are tackfree and free flowing at ordinary room temperature, (b) have a softening point of at least 60° C. and (c) fuse, flow and harden quickly when heated to moderately elevated temperatures.

While the useful range of proportions of resin particles which should be rounded to realize the benefits of the present invention encompasses the proportion in the previously marketed spheroidized resin powder, the mere elimination of particles in the size range of 200–250 micrometers produces important surprising advantages. In an electrostatically charged fluidized bed, the resin powder of the present invention provides significantly greater coating build-up in a given time than does the previously marketed spheroidized resin powder. Furthermore, before the bed is replenished, coating weights applied to a series of articles are more nearly equal when using the novel resin powder. And no one in the prior art had appreciated that a combination of resin particles, some being rounded and others not, would have any beneficial aspect as compared to all rounded particles, much less the avoidance of crater-like depressions which tend to result from the use of too high a proportion of rounded particles.

The difference between the rough and rounded resin particles is quite vivid at magnifications of 100 to 250× at which the rounded resin particles have a glossy appearance as a result of the fusing of at least their surface portions whereas the rough particles have a granular appearance. The difference is comparable to the appearance of polished vs. rough-hewn granite. Perhaps 1–2% of the resin particles may be difficult to classify due to rounding of only a fraction of the surface or a partially fused overall appearance, but the balance are readily distinguished from each other.

Preferably, the particles of the partially spheroidized resin powder should have an average diameter (based on weight) of 25–100 micrometers, and in any event, substantially all should exceed one micrometer in diameter. Best results have been attained where the rounded particles comprise at most 40% (based on count without regard to the mass of individual particles) of the partially spheroidized resin powder in excess of 75 micrometers in diameter, 40–95% of those having diameters of 50–75 micrometers, and at least 80% of those having diameters of 1–50 micrometers. Overall, 30 to 80 percent of the particles of the partially spheroidized resin powder should be rounded and correspondingly 70 to 20 percent should be rough.

THE DRAWING

Suitable apparatus for partially spheroidizing particles of resin powder is shown in the drawing.

As is schematically illustrated, pulverized resin powder 9 is carried by a stream of air through a water-jacketed conduit 10 downwardly into a chamber 11, the cylindrical portion of which is 97 cm in diameter and 183 cm in height. Air is directed through a heater 12 to provide total mixing of the powder and the heated air at a point 15 cm below the mouth of the conduit 10. The air temperature at that point should be 50°–150° C. above, preferably about 100° C. above, the softening point of the resin so that at least the surface portions of many particles of the resin powder fuse to provide rounded or spherical shapes. The feed rate for the powder and the heat input are controlled to provide the desired percentage of fused particles. As the fused particles continue to move downwardly, they contact air which has been cooled to about 10° C. and is being drawn through a screen 13 at the top of the chamber 11 by fans located beyond the funnel 14 which leads to the powder collector (not shown). Upon striking the cool air, the fused portions congeal so that the particles of partially spheroidized resin powder 15 leaving the chamber 11 have nearly the same average mass as the rough particles of pulverized resin powder 9 which are being fed into the apparatus, although a few of the fused particles inevitably collide and fuse together. Because of the flow of cool air, these particles which have been fused are rendered virtually tack-free before striking any solid surface. Otherwise the chamber wall would become coated with resin.

The pulverized resin particles 9 which are fed into the apparatus may be either thermoplastic or thermosetting. When thermosetting, it is usually preferred that the resin and any curing agent and the bulk of the neutral ingredients be fused together before being pulverized to provide the powder to be partially spheroidized, because this insures that each particle of resin contains sufficient resin and curing agent to provide optimum cured products and also insures uniform distribution of the neutral ingredients throughout the protective coating for which the powder is used.

A preferred class of thermosetting resins is epoxy resin such as a polyglycidyl ether of polyhydric phenol. Such an epoxy resin is a normally solid polyglycidyl ether of bisphenol A [bis(4-hydroxyphenyl)dimethylmethane] having an epoxide equivalent of 450–525 and a Durrans' softening point of about 70° C. (e.g., "Epon" 1001). Another suitable normally solid polyglycidyl ether of bisphenol A has an epoxide equivalent of 540–650 and a Durrans' softening point of 75°–85° C. (hereinafter referred to as "Epoxy Resin I"). Also suitable are normally solid polyglycidyl ethers of cresol-formaldehyde novolacs having about 2.5 to 5.5 oxirane groups per average molecular weight (e.g., Ciba ECN-1280). Because protective coatings made with resins employing the epoxy novolacs may be somewhat brittle for certain applications, they are normally used in conjunction with one of the previously mentioned epoxy resins. Another useful epoxy resin is a normally solid condensation product of 1,1,12,2-tetrakis(4-hydroxyphenyl)ethane and epichlorohydrin having an average of about three glycidyl ether groups in the molecule and a Durrans' softening point of about 80° C. Whether thermosetting or thermoplastic, the resin should be normally solid, i.e., be tack-free at ordinary room temperature and have a softening point of at least 60° C., preferably 70°–105° C., to insure that the novel resin powder remains free-flowing after prolonged storage and yet fuses at temperatures which the article to be coated will easily resist.

Where the novel resin powder is thermosetting, the curing agent should be of the latent type so that the powder can be stored for months at room temperature without losing its ability, when heated, to cure to a tough, thermoset state. Suitable curing agents for epoxy resin are disclosed in Winthrop et al. U.S. Pat. No. 3,102,043, Wear U.S. Pat. No. 2,847,395 and Groff et al. U.S. Pat. No. 3,506,598. The term "curing agent" encompasses agents which co-react with the epoxy resin as well as agents which catalyze the reaction of the epoxy resin with itself or with another curing agent. Often both a co-reactive curing agent and a catalyst curing agent are present in order to provide fast curing so that coated articles may be handled within a very short time.

Resin Powder A

| Composition | Parts by weight |
| --- | --- |
| Epoxy Resin I | 57.10 |
| Wetting agent (polymerized ethyl acrylate-long chain hydrocarbon, e.g., "Modaflow") | 0.71 |
| Phthalocyanine blue pigment | 9.50 |
| Titanium dioxide | 42.50 |
| Trimellitic anhydride co-reactive curing agent | 6.93 |
| 2-methyl imidazole catalyst | 0.03 |

The epoxy resin was banded on a rubber mill with one roll preheated to 38° C. and the other precooled to 10° C. After the resin had banded on the warm roll, the neutral ingredients and the imidazole were added. When the mixture was homogenous, the anhydride was added and as soon as it was blended in, the banded material was sheeted off and cooled under a stream of cold air. This was then pulverized and dry blended with ½% by weight of fumed silica ("Cab-O-Sil"). The dry blend was screened through 177-micrometer openings. The size distribution of a sample of this powder was determined using an Allen-Bradley Sonic Sifter, Model L3P, as reported in Table I.

Resin Powder B

A portion of Resin Powder A was carried by a stream of air through spheroidizing apparatus as shown in the drawing at a rate of 65 pounds (29.5 kg) per hour with a heat input of 40,000 BTU ($4.1 \times 10^7$ joules) per hour.

Resin Powder C

Another portion of Resin Powder A was carried through the same spheroidizing apparatus at a rate of 50 pounds (23 kg) per hour with a heat input of 40,000 BTU ($4.1 \times 10^7$ joules) per hour.

Resin Powder D

A further portion of Resin Powder A was carried through the spheroidizing apparatus at a rate of 25 pounds (11.5 kg) per hour with a heat input of 40,000 BTU ($4.1 \times 10^7$ joules) per hour.

TABLE I

| Powder Retained on U.S. Screen Mesh No. | Screen Openings (micrometers) | Particle Size Distribution (% by weight) | | | |
|---|---|---|---|---|---|
| | | Powder A | Powder B | Powder C | Powder D |
| 80 | 177 | 0.3 | 0.4 | 0.4 | 0.4 |
| 140 | 105 | 21.3 | 22.0 | 21.2 | 22.5 |
| 200 | 74 | 20.3 | 18.4 | 20.6 | 20.8 |
| 270 | 53 | 15.3 | 14.7 | 16.1 | 16.3 |
| 325 | 44 | 9.7 | 8.5 | 8.7 | 9.8 |
| 400 | 37 | 4.3 | 7.0 | 8.5 | 7.2 |
| 625 | 20 | 20.7 | 21.6 | 17.9 | 18.8 |
| Pan | — | 8.0 | 7.0 | 5.1 | 3.5 |

Resin Powder C was separated into six size ranges, each of which was examined with a microscope to determine the approximate proportion of particles having smooth, rounded surfaces as opposed to rough surfaces, with results tabulated in Table II.

TABLE II

| Particle size (micrometers) | % of Particles having rounded surfaces |
|---|---|
| over 74 | 20 |
| 53–74 | 60 |
| 44–53 | 93 |
| 37–44 | 96 |
| 20–37 | 99 |
| under 20 | 100 |

Microscopic examination of Resin Powder B and D likewise showed that in each case less than 40% of the larger resin particles (over 75 micrometers in diameter) were rounded; that the percentage of rounded medium sized particles (50–75 micrometers) was within the range of 40–95; and that more than 80% of the small particles (1–50 micrometers) were rounded.

Overall, the rounded particles comprised 0% of Resin Powder A, 64% of Powder B, 65% of Powder C and 80% of Powder D.

Each of Resin Powders A, B, C and D was coated onto steel panels in the following manner. Each was separately placed in an electrostatically charged fluidized bed apparatus to an initial depth of about 1.0 cm and aerated with an air flow of 0.85 m³ per hour to a depth of about 1.6 cm. The broad surface (8.9 cm × 14 cm) of a preweighed grounded metal panel was held 9.5 cm above and parallel to the surface of the aerated bed while a charge of negative 20,000 volts was applied for a period of six seconds. The panel was removed, weighed and the gain in weight recorded before being placed in an oven at 205° C. for ten minutes to cure the resin. Ten consecutive panels were coated with each resin powder, results shown in Table III.

TABLE III

| Panel # (in order of coating) | Electrostatic Deposition in Grams | | | |
|---|---|---|---|---|
| | Powder A | Powder B | Powder C | Powder D |
| 1 | 1.85 | 6.67 | 6.96 | 5.95 |
| 2 | 1.53 | 5.42 | 6.06 | 5.06 |
| 3 | 1.35 | 5.85 | 6.11 | 5.15 |
| 4 | 1.33 | 5.82 | 6.03 | 4.90 |
| 5 | 1.30 | 5.91 | 6.04 | 5.02 |
| 6 | 1.32 | 6.04 | 6.07 | 4.92 |
| 7 | 1.22 | 5.98 | 6.08 | 4.87 |
| 8 | 1.26 | 5.85 | 6.03 | 4.77 |
| 9 | 1.15 | 5.79 | 5.83 | 4.75 |
| 10 | 1.04 | 5.59 | 5.47 | 4.98 |

The data of Table III was obtained over a period of days so that the moisture content of the air should have been fairly constant. However, there may be some error in the data in that no effort was made to monitor or control the moisture content of the air. Regardless of the possibility of some error, the partially rounded Resin Powders B, C and D of the present invention do provide substantially more rapid powder build-up and more uniformity of powder build-up from panel to panel than does the rough Resin Powder A. In respect to rate of powder build-up, Resin Powders B and C are considered to be somewhat superior to Powder D which contained a higher proportion of smooth, rounded particles.

As compared to resin powder which, like Resin Powder C, has been carried through the spheroidizing apparatus at a rate of 50 pounds (23 kg) per hour with a heat input of 40,000 BTU ($4.1 \times 10^7$ joules) per hour but, unlike Powder C, has been screened through 250-micrometer openings both before and after being partially spheroidized, each of Powders B, C and D provides more rapid coating build-up, more uniformity of coating build-up over a 10-panel test, and smoother coatings.

The throwing power of resin powder or its ability to coat into deep narrow slots was tested using unheated aluminum blocks 8.9 cm × 5.7 cm × 3.8 cm having slots of five sizes extending the full length of the broadest surface as follows:

1.27 cm wide × 2.54 cm deep
0.95 cm wide × 2.54 cm deep
0.635 cm wide × 2.54 cm deep
0.32 cm wide × 1.91 cm deep
0.16 cm wide × 1.27 cm deep The blocks were held 7.9 cm above the electrostatically charged bed so that the lengths of the slots extending vertically. A negative charge of 20,000 volts was applied for a period of 12 seconds. The length of each slot that was fully coated with resin powder (8.9 cm maximum) is recorded in Table IV.

TABLE IV

| Slot size (cm) | Length of Slot Coated (cm) | | | |
|---|---|---|---|---|
| | Powder A | Powder B | Powder C | Powder D |
| 1.27 | 2.6 | 7.0 | 7.6 | 8.3 |
| 0.95 | 1.3 | 6.4 | 7.0 | 8.0 |
| 0.635 | 0.7 | 6.3 | 6.4 | 7.0 |
| 0.32 | 0.4 | 5.1 | 5.4 | 5.7 |
| 0.16 | 0.3 | 4.5 | 4.5 | 5.1 |

From the data of Table IV, it can be seen that a higher percentage of rounded particles provides better penetration. Resin powder which is more highly spheroidized than Resin Powder D would provide even greater slot coverage.

When using an electrostatically charged fluidized bed of spheroidized resin powder to coat articles at temperatures below the softening point of the resin, the coatings tend to have crater-like depressions. This is believed to be due to charges retained by deposited resin particles repelling other resin particles. With consecutively coated panels, an increase in repulsion occurs, apparently due to a gradual residual charge build-up on the bed particles. When coating a stator, the coating on the face of the stator may develop a number of craters before a usefully heavy deposit is received in the slots.

To evaluate the effect of this phenomenon, some of the cured panels of Table III were examined and evaluated for the number and size of crater-like depressions. An arbitrary number from 0 to 5 was assigned with 0 representing no repulsion and 5 representing many sizeable craters. Results are tabulated in Table V.

TABLE V

| | Arbitrary Ratings of Charge Saturation | | | |
| --- | --- | --- | --- | --- |
| Panel # | Powder A | Powder B | Powder C | Powder D |
| 1 | 0 | 0 | 0 | 1.8 |
| 2 | 0 | 0 | 1.0 | 2.0 |
| 3 | 0 | 0 | 1.3 | 3.3 |
| 4 | 0 | 1.0 | 1.4 | 3.8 |
| 5 | 0 | 1.2 | 1.9 | 4.4 |
| 6 | 0 | 1.4 | 2.9 | |
| 7 | 0 | 1.6 | 3.2 | |
| 8 | 0 | 1.9 | 3.4 | |
| 9 | 0 | 2.0 | 3.8 | |
| 10 | 0 | 3.0 | 4.0 | |

As can be seen from Table V, Resin Powder D is of marginal utility, and the less susceptibility of Powders B and C to cratering more than offsets the slightly better throwing power of Powder D reported in Table IV. Powders more highly spheroidized than Powder D have even greater tendency to produce protective coatings having undesirable cratering. On the other hand, the previously marketed spheroidized resin powder mentioned above which contained resin particles larger than 200 micrometers did not involve any more cratering than does Resin Powder C.

We claim:

1. Resin powder for applying protective coatings, which powder consists of a mixture of resin particles which as stored are free flowing at ordinary room temperature and would pass through a screen having openings not exceeding 200 micrometers, which particles have a softening point of at least 60° C. but fuse, flow and harden quickly when heated to moderately elevated temperatures, 30–80% of the particles being rounded and at magnifications of 100 to 250X having a glossy appearance comparable to that of polished granite and correspondingly 70–20% being rough and at magnifications of 100 to 250X having a granular appearance comparable to that of rough-hewn granite, which mixture of rough and rounded particles enhances electrostatic coating operations.

2. Resin powder as defined in claim 1 wherein each individual particle comprises a blend of thermosetting resin and curing agent.

3. Resin powder as defined in claim 2 wherein the thermosetting resin is an epoxy resin.

4. Resin powder as defined in claim 3 wherein the epoxy resin is a polyglycidyl ether of polyhydric phenol.

5. Resin powder as defined in claim 1 wherein the rounded particles comprise at most 40% of the particles in excess of 75 micrometers in diameter, 40–80% of the particles 50–75 micrometers in diameter, and at least 80% of the particles 1–50 micrometers in diameter.

6. Powdered resin for applying protective coatings consisting of resin particles which as stored are free flowing at ordinary room temperature and would pass through screen having 177-micrometer openings and would not pass screen having 1-micrometer openings, which particles have a softening point of at least 60° C. but fuse, flow and harden quickly when heated to moderately elevated temperatures, characterized in that 30–80% of the particles are rounded and at magnifications of 100 to 250X have a glossy appearance comparable to the appearance of polished granite and correspondingly 70–20% are rough and at magnifications of 100 to 250X have a granular appearance comparable to the appearance of rough-hewn granite.

* * * * *